(12) United States Patent
Joglekar

(10) Patent No.: US 9,852,202 B1
(45) Date of Patent: Dec. 26, 2017

(54) BANDWIDTH-REDUCED COHERENCY COMMUNICATION

(71) Applicant: INTERNATIONAL BUSINESS MACHINES CORPORATION, Armonk, NY (US)

(72) Inventor: Amit P. Joglekar, Olathe, KS (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/274,104

(22) Filed: Sep. 23, 2016

(51) Int. Cl.
*G06F 7/00* (2006.01)
*G06F 17/00* (2006.01)
*G06F 17/30* (2006.01)

(52) U.S. Cl.
CPC .. *G06F 17/30578* (2013.01); *G06F 17/30324* (2013.01); *G06F 17/30368* (2013.01)

(58) Field of Classification Search
CPC ......... G06F 17/30578; G06F 17/30324; G06F 17/30368; G06F 17/30575; G06F 17/30174
USPC ........................................................ 707/613
See application file for complete search history.

(56) References Cited

U.S. PATENT DOCUMENTS

| | | | | |
|---|---|---|---|---|
| 5,799,165 A * | 8/1998 | Favor | ................... | G06F 9/3812 712/214 |
| 6,195,744 B1 * | 2/2001 | Favor | ....................... | G06F 7/74 712/215 |
| 7,096,330 B1 | 8/2006 | Root et al. | | |
| 8,620,883 B2 | 12/2013 | Madsen et al. | | |
| 2008/0114793 A1 * | 5/2008 | Grosset | ............. | G06F 17/30333 |
| 2008/0140971 A1 * | 6/2008 | Dankel | ............... | G06F 12/0284 711/163 |
| 2008/0282040 A1 * | 11/2008 | Doring | ................ | G06F 12/0862 711/141 |
| 2010/0223239 A1 | 9/2010 | Madsen et al. | | |
| 2011/0078381 A1 * | 3/2011 | Heinrich | ............. | G06F 12/0842 711/122 |

(Continued)

OTHER PUBLICATIONS

Kiefer, "Diff-Merge-Patch", pp. 1-6 (2013) https://www.npmjs.com/package/diff-merg-patch.

(Continued)

*Primary Examiner* — Hosain Alam
*Assistant Examiner* — Nicholas Allen
(74) *Attorney, Agent, or Firm* — Weitzman Law Offices, LLC

(57) ABSTRACT

A computerized, bandwidth-reduced method of reconciling two ordered sets of values such that a series of changes made to the one are reflected in the other, the method involves maintaining, a positions list, tracking each positional change made to an ordered set and replicating each positional change in the positions list. When a reconciliation is required for a corresponding ordered set in a second location, the method involves creating a concise representation of the changes using the positions list and content of the ordered set by generating a REMOVE SERIES, a SWAP SERIES, an INSERT SERIES, and a CHANGE SERIES, transferring the concise representation from the first location to the second location via a communication path, and sequentially applying the REMOVE SERIES, SWAP SERIES, INSERT SERIES and CHANGE SERIES of the concise representation to the ordered set at the second location.

1 Claim, 4 Drawing Sheets

(56) References Cited

U.S. PATENT DOCUMENTS

| | | | |
|---|---|---|---|
| 2011/0314263 A1* | 12/2011 | Greiner | G06F 9/3001 712/221 |
| 2012/0041928 A1 | 2/2012 | Kamra et al. | |
| 2012/0059963 A1* | 3/2012 | Pasupuleti | G06F 17/30362 710/200 |
| 2014/0040552 A1* | 2/2014 | Rychlik | G06F 12/0815 711/122 |
| 2014/0137119 A1* | 5/2014 | Hyde | G06F 21/56 718/100 |
| 2014/0164741 A1* | 6/2014 | Gschwind | G06F 9/30029 712/205 |
| 2014/0279920 A1* | 9/2014 | Madhavarapu | G06F 17/30283 707/649 |
| 2014/0279931 A1* | 9/2014 | Gupta | G06F 17/30575 707/683 |
| 2014/0372696 A1* | 12/2014 | Tune | G06F 12/0864 711/114 |
| 2015/0067264 A1* | 3/2015 | Eckert | G06F 12/126 711/133 |
| 2015/0067266 A1* | 3/2015 | Jafri | G06F 12/0804 711/136 |
| 2015/0067658 A1* | 3/2015 | Hahnenberg | G06F 12/0815 717/148 |
| 2016/0026445 A1* | 1/2016 | Abdallah | G06F 8/443 717/148 |
| 2016/0110408 A1* | 4/2016 | Madhavarapu | G06F 17/30578 707/615 |
| 2016/0147470 A1* | 5/2016 | Stefanowicz | G06F 12/00 711/111 |

OTHER PUBLICATIONS

Plus2Net, "Array-Diff: Difference between two arrays," pp. 1-4, downloaded Aug. 15, 2016 (2016) http://www.plus2net.com/php_tutorial/array_diff.php.

* cited by examiner

BANDWIDTH-REDUCED COHERENCY COMMUNICATION

FIELD OF THE INVENTION

This disclosure relates generally to computers and, more particularly, to maintaining computer data coherency.

BACKGROUND

An ordered list (interchangeably referred-to herein as an "ordered set") is a fundamental data structure in computing (sometimes also referred to in computing as an "array" or "vector" or "sequence"). In use, various types of changes can be made to an ordered set of values: a value in the set can be changed, a new value can be inserted into the set, a value can be removed from the set, two values in the set can be exchanged for each other, or an existing value in the set can be moved to another position.

In various computer environments, copies of ordered sets are often maintained in separate locations for different reasons, so it is often necessary to make sure that when changes are made to one instance of the ordered set, before some other instance of the list can be used, that other instance must be made consistent with the changed original (i.e., data coherency among them is maintained).

For example, in a client-server architecture environment, it is not unusual for an ordered set to be stored on, or within storage at, the server, and a copy of that ordered set to be transferred or maintained at a client computer. When changes are made to the ordered set at the client computer, those changes typically need to also be reflected in the ordered set at the server to ensure coherency between the two.

Likewise, for high availability purposes, some document oriented databases may have multiple replicas that must be kept synchronized.

Additionally, change management systems that maintain multiple versions of data in the form of ordered sets, to avoid maintaining multiple copies of the data, typically store only an initial state of data (e.g., version 1) and they store change "differences" for subsequent versions and, when a particular version of the data is required, they must apply those differences sequentially to the initial state (e.g., version 1) to construct the requested version.

In all such cases, maintaining coherency among the ordered sets requires transfers of whatever information is needed to ensure data consistency. Since the ordered sets can be quite large, such transfers of the entire ordered set or even all of the changes (also referred to as "deltas" or "diffs") can consume significant bandwidth (whether communicated over a network, a computer's internal bus, or some other communication path) and, in some cases, adversely affect processing capability by occupying processing time that could otherwise be used by the computer system for other purposes. In some cases, the communication bandwidth consumption and/or loss of processing capability can even adversely affect other parts of the computer system that have nothing to do with the ordered sets or their associated programs by temporarily "blocking" other activity, for example, by maintaining control of a communication path or causing other processing activity to have to "wait" for completion of some task.

Thus, there is an ongoing technological problem involving the amount of communication bandwidth and/or processing capability/storage space used by computer systems when maintaining coherency among two or more copies of ordered sets.

SUMMARY

One aspect of this disclosure involves a computerized, bandwidth-reduced method of reconciling two ordered sets of values one of the ordered sets being located at a first location and an other of the ordered sets being located at a second location, such that a series of changes made to the one of the at least two ordered sets of values is reflected in the other of the at least two ordered sets of values. The method involves, (a) using a processor of a computer at the first location, (a)(i) maintaining, in storage, a positions list of a size corresponding to a number of entries in an ordered set of the at least two ordered sets, the list initially containing consecutive index numbers in ascending order reflective of an initial position of each entry in the list, and (ii) tracking each positional change that is made to the ordered set and, as each positional change is made, replicating each positional change for the entries in the positions list such that (a)(ii)(A) when an element of the ordered set is removed from the ordered set, the removal is replicated in the positions list, (a)(ii)(B) when an element of the ordered set is moved to a new position, the position movement is replicated in the positions list, (a)(ii)(C) when a new element is inserted into the ordered set at a specific position, a placeholder value is inserted into the positions list at a position corresponding to the specific position, (a)(ii)(D) when a value of an element changes from a first value to a second value without a position change, no modification is reflected in the positions list, and (a)(ii)(E) a concurrent movement of one element from a first position to a second position and value change at the second position is sequentially treated as a removal from a first position and new element insertion at the second position.

The method further involves (a)(iii) once a reconciliation is required for the ordered set in the second location, then, at the first location using the processor, creating a concise representation of the changes using the positions list, then-current content of the ordered set, and content of the ordered set immediately prior to a first change in the series of changes by (a)(iii)(A) identifying, in the positions list, all index numbers that do not appear in the positions list and generating a REMOVE SERIES which, when implemented in the second location, will remove all elements from the ordered set in the second location that correspond to the index numbers that do not appear in the positions list in the first location, (a)(iii)(B) analyzing, positions of all pre-existing elements in the positions list both following the changes and prior to the changes, and generating a SWAP SERIES which, when implemented in the second location, will rearrange the elements from the ordered set in the second location to the locations corresponding to the ordered set in the first location, (a)(iii)(C) identifying all placeholder values in the positions list and generating an INSERT SERIES which, when implemented in the second location, will insert the values from positions in the ordered set in the first location corresponding to those placeholder values into the ordered set in the second location, and (a)(iii)(D) identifying, for all pre-existing index numbers in the positions list, whether their corresponding element values in the ordered set in the first location changed from their values prior to the changes, and for each instance where a value changed, generating a CHANGE SERIES which, when implemented in the second location, will effect corresponding value changes to the ordered set in the second location.

The method then involves (b) transferring the concise representation from the first location to the second location via a communication path; and (c) using at least one processor, at the second location, applying the concise representation to the ordered set in the second location by (c)(i) applying the REMOVE SERIES to the ordered set in the second location in decreasing position order, (c)(ii) after the REMOVE SERIES has been applied, applying the SWAP SERIES to the ordered set in the second location, (c)(iii) after the SWAP SERIES has been applied, applying the INSERT SERIES to the ordered set in the second location in increasing position order, and (c)(iv) after the INSERT SERIES has been applied, applying the CHANGE SERIES to the ordered set in the second location. After the application of the CHANGE SERIES at the second location, the two ordered sets of values in the first and second locations will be reconciled as of a time the reconciliation between the two ordered sets was required.

The foregoing and following outlines rather generally the features and technical advantages of one or more embodiments of this disclosure in order that the following detailed description may be better understood. Additional features and advantages of this disclosure will be described hereinafter, which may form the subject of the claims of this application.

BRIEF DESCRIPTION OF THE DRAWINGS

This disclosure is further described in the detailed description that follows, with reference to the drawings, in which.

DETAILED DESCRIPTION

Figure 1:
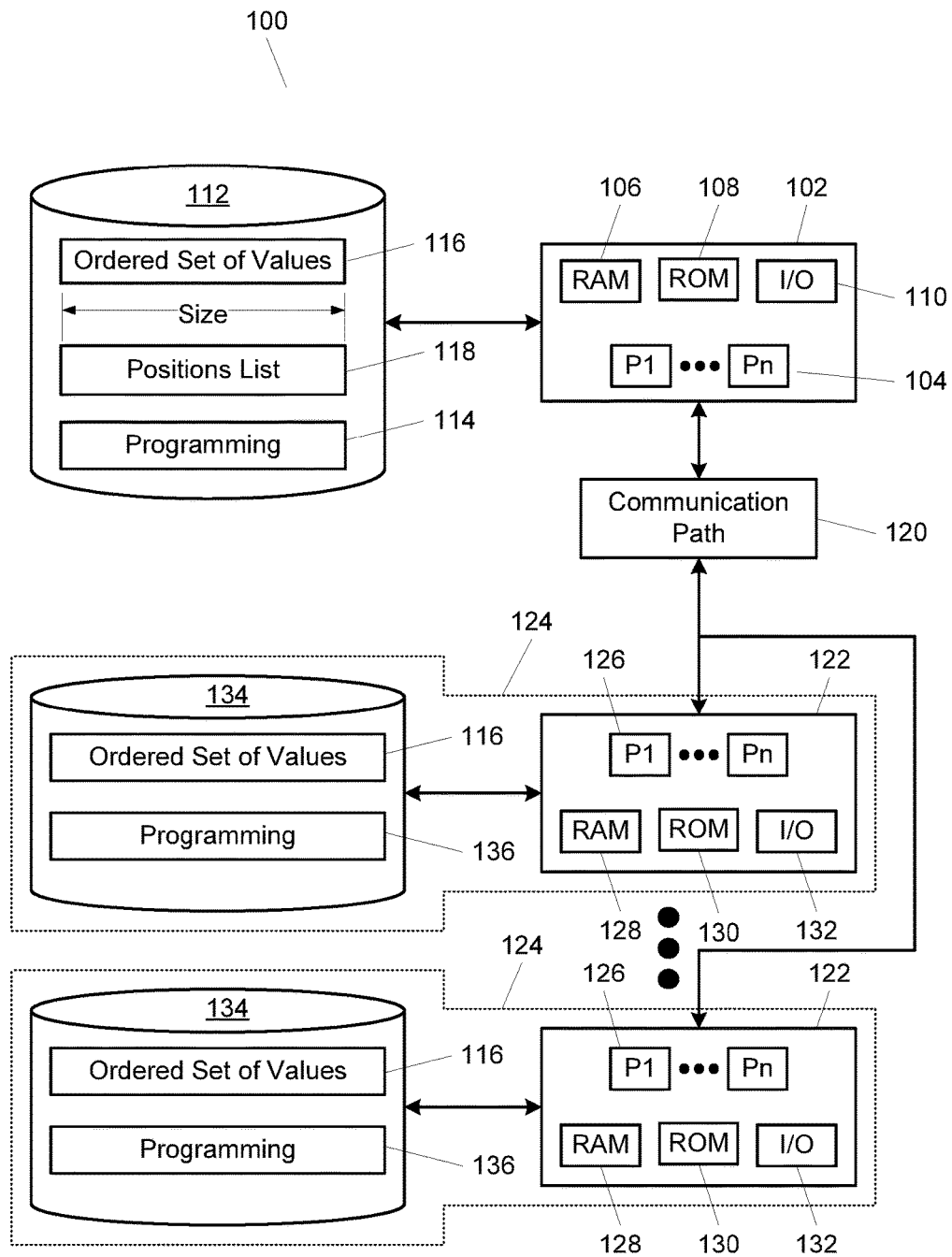
FIG. 1 illustrates, a simplified overview of one example of an implementation of the instant solution in a client-server environment.

This disclosure provides a technical solution to address the aforementioned problems and improves upon the functioning of such computers and a computer industry process, specifically, the maintaining of coherency among sets of replicated data. The solution is necessarily rooted in computer technology (e.g., at least some client-server technology, document oriented databases and change management systems) because it solves a problem of communication network/path bandwidth utilization by reducing the bandwidth required to communicate the changes needed to ensure data coherency, and/or storage space utilization (i.e., storage required for storing multiple versions of an ordered list. The solution only has meaningful utility in computer technology because it is addressed to a specific problem that only arises in the computing arts, i.e., processor and inter-processor/inter-computer communication network/path bandwidth utilization and/or storage space utilization. Advantageously, in that context, it has broad applicability to any computer application involving bulk/batch tracking of changes to an ordered set in one location and application of those changes to a list copy in one or more other locations for purposes of maintaining coherency.

In simplified overview, the instant solution involves tracking changes made to an ordered set of values (as noted above, sometimes referred to, depending upon programming language, as a list, array, vector, or sequence), and representing all the changes that have been made in a concise form that, when implemented on a replication of the ordered set somewhere else, will effect the result of the changes made to the original ordered set. The representation is defined as "concise" because it is not merely a step by step tracking of each and every change that happens to the ordered set, rather it is a reduced set of instructions that will bring the two ordered sets into coherency as of the time that reconciliation between the two was required. Advantageously, this concise representation does so by, in effect, eliminating the effect of changes that cancel each other out in some manner, for example, instances where a new element is added to the set and then later removed, or a swap is cancelled out by an opposite swap, or an element is moved to a new location only to later be removed, or an element is removed from a place in the set and later a new element is inserted into that same place, or a particular element undergoes a series of value changes.

As a result, in most cases, the concise representation will require fewer steps than would be involved tracking each change and then re-applying the changes to the copy in a sequential step by step manner (which is highly inefficient if a large number of changes are made to a list), or replacing all elements in the copy with all the elements from the then-current ordered set (which is highly inefficient when very few changes are made to a large ordered set). Thus, in all but the most trivial or outlier cases, the instant solution will require less bandwidth to communicate the changes (or copy of the updated ordered set) from one location to another and/or require less processing to synchronize the two and/or require less storage than would be involved in sequentially applying all of the changes or overwriting the entire ordered set with the changed ordered set. At this point it should be noted that, in some outlier cases, the concise representation can involve the same number of steps as, but advantageously will never involve more steps than, the step by step re-application approach. This can happen, for example, where none of the changes made to the ordered set cancel out any other prior change.

Still further, in most cases, maintaining the concise representation will require less storage than maintaining all of the changes that must be sequentially applied for synchronization or a copy of the original ordered set along with the then-current list.

With the foregoing in mind, FIG. 1 illustrates, a simplified overview of one example of an implementation 100 of the instant solution in a client-server environment.

The implementation 100 is made up of a server 102 containing at least, one or more processors 104, RAM 106, ROM 108, and I/O 110. The server 102 is also coupled to storage 112 containing, among other things, programming 114 which, when executed by the processor(s) 104 will cause the processor(s) 104 to operate as described herein. The storage also includes at least one ordered set of values 116 and, as described in greater detail below, a positions list 118 that corresponds in size to the size of the ordered set of values 116.

At this point, it is to be understood that, unless specifically expressly stated herein, any reference to "storage" is intended to mean any storage medium that stores data, data-containing structures, and program instructions in a non-transitory manner, for example, such as non-transient solid state memory, a magnetic hard drive, a CD or DVD, a tape drive, or an analogous or equivalent storage medium type would.

The server 102 is coupled, via a communication path 120 to one or more client computers 122 at respective locations 124. Depending upon the particular implementation, the communication path 120, per se, can be wired or wireless and may be of any type conventionally used to allow servers 102 and client computers 122 to communicate with each other using any appropriate communication protocol, or that allows at least one processor (or processor core) to communicate with another processor (or processor core) whether they are located a few centimeters, many kilometers, or more away from each other, or on the same die.

As is typical, the client computers 122 contain one or more processors 126, and associated RAM 128, ROM 130, and I/O 132 as well. The client computers 122 also may have additional conventional devices (not shown) connected to them, typically via the I/O 132, to allow for input (e.g., keyboard, mouse, etc.) and/or output (e.g., display, printer, etc.)

The client computers 122 are also coupled to storage 134 (which, in some cases, may be shared by multiple client computers 122). The storage 134 likewise contains programming 136 that, among other things, when executed by the processor(s) 126, will cause the processor(s) 126 to operate as described herein. The storage is further configured to receive and maintain a copy of the ordered set of values 116 that can be modified as a result of actions at a client computer 122, resulting in the ordered set of values 116 at the server needing to be reconciled to maintain consistency between/among the ordered set of values 116 at the client computer(s) 122 and server 102 as described herein.

Figure 2:
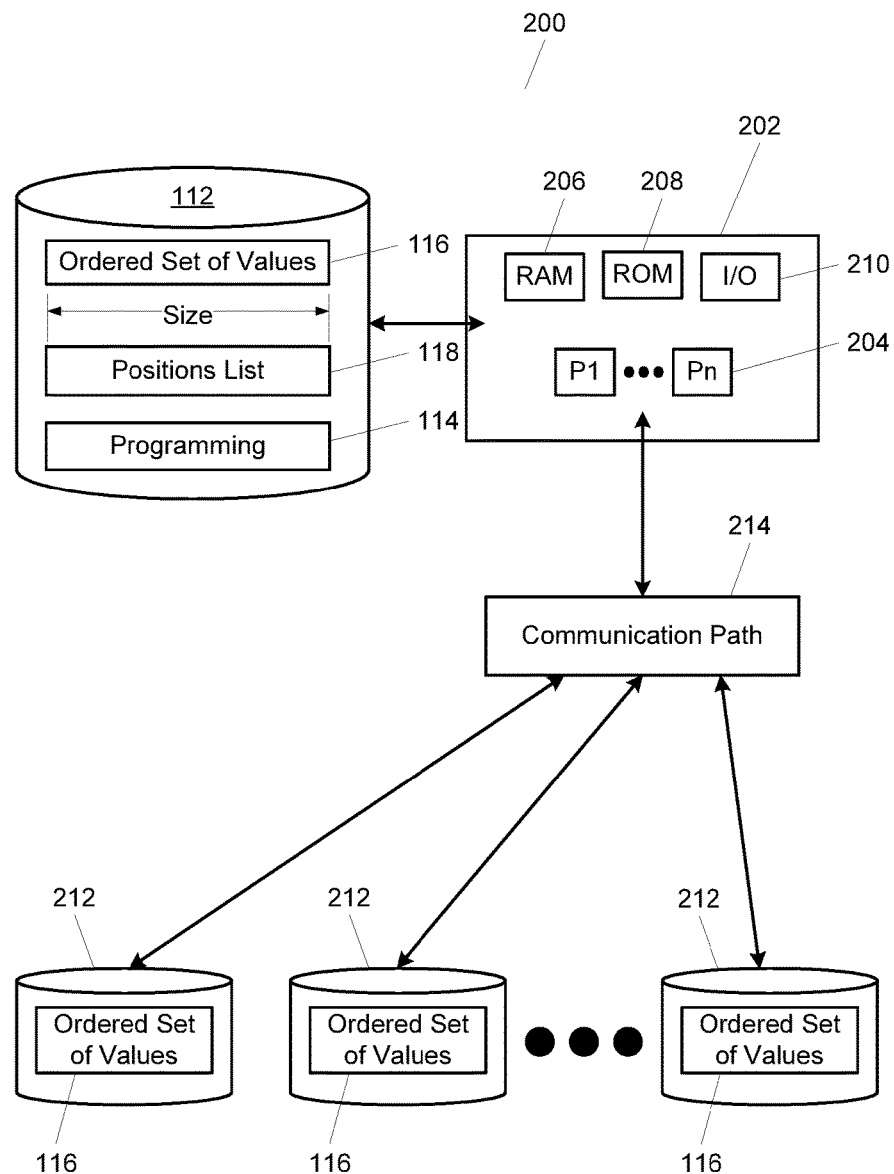
FIG. 2 illustrates, a simplified overview of another example of an implementation of the instant solution which, in this example, may be, for example, a document-oriented, database-containing, system and/or a change management system.

FIG. 2 illustrates, a simplified overview of another example of an implementation 200 of the instant solution which, in this example, may be, for example, a document oriented database-containing system and/or a change management system.

The implementation of FIG. 2 is similar to that of FIG. 1 in that it includes a computer 202 having one or more processors 204, RAM 206, ROM 208, and I/O 210 coupled to storage 112. However, the system of FIG. 2 also contains multiple copies of the ordered set of values 116 that may be separately stored 212 in one or more discrete storage devices or in different parts of the same storage 112 as the original ordered set of values 116 that are accessible to the processor(s) 204 via a communication path 214 that may be a bus or a network, depending upon the implementation. In addition, in some cases, the communication path 214 may be within the computer 202 and simply be a "handoff" place in memory or other storage where a "concise representation" as described herein can be placed for use, either by that processor or core or another processor or core, in updating a copy of the ordered set following a context switch (also sometimes referred to as a process switch or a task switch).

Thus, based upon FIGS. 1-2, it should be understood that the solution described herein is not dependent upon any particular system configuration. Rather, all that is required is a system that contains at least one ordered set of values that gets changed and at least one other ordered set of values that must be synchronized with it at some time after such change(s) are made. Moreover, it is to be understood that, in some cases, an ordered set of values may be an "original" set at one point in time, but may be a "copy" at another point in time. Advantageously, the instant solution does not require that a single ordered set of values always be maintained as the "original" but rather it allows for (and still provides the recited advantages) any individual ordered set of values to be modified and have the changes represented as a concise representation that can be transferred for use in reconciling one or more other ordered set of values. Additionally, with the instant approach, the ordered set of values need not involve elements of the same type. So, advantageously, the solution will work even if elements in an ordered set are of different types (e.g., arrays in languages like JavaScript, Ruby, etc.).

Having described some example systems of the many within which the solution may be used, the solution process will now be described, first, in overview, and then with reference to representative simple examples.

First, at the location where changes to the ordered set of values will be made, the processor(s) create a positions list that is sized so as to correspond to the size of the ordered set of values (e.g., if the ordered set of values initially has 374 elements, the positions list will also have 374 elements). The positions list elements are consecutively ascending numbers, which, depending upon the programming language used to implement the solution, will typically be zero-based (i.e., the first element is 0, then 1, then 2, etc.) or unity based (i.e., the first element is 1, then 2, then 3, etc.), although it is possible to use some other value as the starting point and have some different incrementing between elements, however, doing so will likely make the process much more complex and cumbersome and may involve some form of scaling or offset calculation.

Thus, if the ordered set contained five values, for example, [23, 9, 4, 18, 62], the positions list would have five values and, using zero-based indexing, would look something like:

[0, 1, 2, 3, 4]

The positions list is used for tracking operations on the ordered set that result in position changes, i.e., removal of an element, swapping (i.e., exchanging) of two or more elements, or moving of an element. As a result, every time a position changing operation is performed on the ordered set (also referred to herein as the "target list") the same change is made in the positions list to its corresponding elements.

In addition, if the operation involves insertion of a new element in the ordered set, a placeholder indicator value, that cannot be confused with one of the index values, is inserted in the positions list at that index. For purposes of explanation herein, the value "−1" is used to specify an insertion of a new entry into the ordered set. For example, if a new value of "77" was inserted between the index 3 and index 4 positions such that the ordered set now looks like [23, 9, 4, 18, 77, 62], then the positions list would reflect that insertion as follows: [0, 1, 2, 3, −1, 4].

Of course, the selection of the particular value used for this purpose is arbitrary. The current solution uses "−1" for convenience because there is no such thing as a negative position, but it could have used any other negative value or, in some implementations, any other letter(s) or symbol(s) could be used, the important aspect being the ability to unambiguously identify an element insertion (i.e., differentiate it from an element that was present at the time the process began), not the manner in which it is indicated. In addition, for simplicity (and advantageously), the same indicator is used for all insertions, however, there is no reason why more than one indicator could not be used in some implementations.

Any operation performed on the ordered set that changes the current value at some index location to a new value does not get represented in the positions list. This is because there in no position change involved in that operation. For example, with the above ordered set of [23, 9, 4, 18, 62] if the value at index "2" was changed from a "4" to any other value, that value change would not be reflected in the positions list because that element remained where it was.

The foregoing process of tracking changes to the ordered set continues until such time as a reconciliation is required between the changed ordered set and some other original (pre-changes) copy of the ordered set, or in case of change management system, when the then-current state of an ordered set is to be saved as a next version. For example, reconciliation may be required as a result of a request being made for a copy of the ordered set, upon the existence of some indication that all changes to an ordered set have been made (e.g., a "save" command), or based upon some other indication. In this regard, systems that deal with copies of ordered sets include mechanisms (e.g., "locks" or "check out", etc.) that ensure that a "stale" version of an ordered set is not provided in response to a request if a copy has been or is in the process of being modified. It should be understood that the instant solution will use/rely upon such a mechanism as well.

At the time that the reconciliation is required, the processor(s) will use the positions list and ordered set to construct a concise representation of the changes.

At this point, some definitions will be presented for purposes of the remaining explanation.

As used herein, the term "REMOVE SERIES" is intended to mean, a set of instructions that cause removal of element(s) from a copy of the ordered set, the term "SWAP SERIES" is intended to mean, a set of instructions that cause exchanging of element pair(s) in the copy of the ordered set, the term "INSERT SERIES" is intended to mean, a set of instructions that cause respective value(s) from the changed ordered set to be inserted in the copy of the ordered set, and the term "CHANGE SERIES" is intended to mean, a set of instructions that cause a change in value(s) for any indicated element(s) of the copy of the ordered set.

Of course, it is to be understood that the specific instructions that would be used to accomplish what is described will vary from programming language to programming language (e.g., Java, Python, C++, Visual Basic, Ruby, etc.).

In addition, it should be understood that, depending upon the specific changes that are made to a given ordered set, it is possible that creation of one or more of the "REMOVE SERIES", "SWAP SERIES", "INSERT SERIES" and/or "CHANGE SERIES" may not be necessary, for example, when the changes are limited to only changing different element values and/or a series of changes that do not include insertion of any elements, and/or only changes where none of the changes involve, in actuality or effect, any swaps and/or any removes.

Examples of this process will now be provided using JavaScript Object Notation (JSON) which is a text format that facilitates structured data interchange (e.g., objects consisting of attribute-value pairs) among programming languages and is defined in Internet Engineering Task Force (IETF) RFC 7159 and ECMA International Standard ECMA-404.

For purposes of example simplicity and conformity with common programming, the examples use zero-based indexing. As such, the instruction:

"set(index, newValue)" changes the value at the specified index, e.g., set(3, 23) will result in a change of the element at index location "3" to the value "23" so, if applied to an ordered set [5, 2, 7, 9, 3], it would cause the ordered set to look like [5, 2, 7, 23, 3];

"insert(index, newValue)" inserts a new element with the specified value at the specified index, e.g., insert(2, 4) results in insertion of the value "4" at index location "2" (e.g., if applied to an ordered set [5, 2, 7, 9, 3] it would cause the ordered set to look like [5, 2, 4, 7, 9, 3];

"remove(index)" removes the element at the specified index, e.g., remove(0) applied to an ordered set [5, 2, 7, 9, 3] will result in an ordered set of [2, 7, 9, 3];

"swap(index1, index2)" swaps the elements at the specified index locations, e.g., swap(1, 4) applied to ordered set [5, 2, 7, 9, 3] will result in an ordered set of [5, 3, 7, 9, 2]; and "move(index1, index2)" moves the element at the index location "index1" to the index location "index2", e.g., move(2, 4) applied to the ordered set [5, 2, 7, 9, 3] will result in an ordered set of [5, 2, 9, 3, 7].

Note here that there is a difference between the "swap" and "move" operations. The "swap" operation only affects the specific two indexes that are swapped and other values remain unchanged. In contrast, a "move" operation causes a one-place shift to the left or right (as appropriate) for all of the values between the indexes ("index1" and "index2").

In the example, presume that the initial ordered set is [6, 8, 5, 1, 7] (the changed ordered set is referred to thereafter as a "Target List" to avoid confusion as changes are made).

Once a change is to be made, a copy of the initial ordered set is retained for later use as described below.

In addition, a positions list is created as described above, in this case using zero-based indexing, whose size matches the size of the initial ordered set, i.e., [0, 1, 2, 3, 4].

Change Tracking

As noted above, change tracking is performed such that, every time a position change is made to the "target list" using one of the functions—remove(index), swap(index1, index2) or move(index1, index2), the same change is made to the "positions list" (to avoid further confusion, the positions list, as changes are made, is referred to as the "Current Positions List"). Likewise, every new element inserted into the target list using the function insert(index, newValue) is reflected in the Current Positions List by insertion of the value −1 at that index. Finally, a change in an element's value effected by the function set(index, newValue) does not get reflected in the "Current Positions List" because there in no position change involved in that function.

Table 1 below shows a series of nine (9) sequential changes that are sequentially made to the ordered set and their effect on the corresponding Current Positions List:

TABLE 1

| Step | Change | Target List (Current State) | Current Positions List |
|---|---|---|---|
| 0 |  | [6, 8, 5, 1, 7] | [0, 1, 2, 3, 4] |
| 1 | remove(1) | [6, 5, 1, 7] | [0, 2, 3, 4] |
| 2 | insert(3, 9) | [6, 5, 1, 9, 7] | [0, 2, 3, −1, 4] |
| 3 | set(0, 4) | [4, 5, 1, 9, 7] | [0, 2, 3, −1, 4] |
| 4 | remove(1) | [4, 1, 9, 7] | [0, 3, −1, 4] |
| 5 | insert(4, 3) | [4, 1, 9, 7, 3] | [0, 3, −1, 4, −1] |

TABLE 1-continued

| Step | Change | Target List (Current State) | Current Positions List |
|---|---|---|---|
| 6 | swap(0, 3) | [7, 1, 9, 4, 3] | [4, 3, −1, 0, −1] |
| 7 | move(1, 3) | [7, 9, 4, 1, 3] | [4, −1, 0, 3, −1] |
| 8 | insert(2, 5) | [7, 9, 5, 4, 1, 3] | [4, −1, −1, 0, 3, −1] |
| 9 | remove(1) | [7, 5, 4, 1, 3] | [4, −1, 0, 3, −1] |

Creating the Concise Representation

After all change are complete, the final "Current Positions List" and copy of the "original" ordered set is used as follows to create the "concise representation" of the changes as follows:

1) Generation of the REMOVE SERIES for Removed Elements:

First, under program control, the processor(s) scan the Current Positions List—[4, −1, 0, 3, −1] for missing indexes (i.e., missing values between 0 and 4). As a result, Indexes 1 and 2 are missing, so, in this case, the REMOVE SERIES: "REMOVE":[1,2] is generated.

2) Generation of the SWAP SERIES for Swapped and/or Moved Elements:

Once the REMOVE SERIES has been generated, the Current Positions List is used to determine the current positions of pre-existing elements (i.e., elements in the Current Positions List with an index of "0" or greater) while ignoring any values of "−1" in that list for now. So, that yields: [4, 0, 3]. Next, 0-based indexes are assigned to these positions as:

Elements$_1$: [4, 0, 3] Indexes$_1$: [0, 1, 2]

Originally, before any changes were made to the target list, the order of the element positions was increasing order: [0, 3, 4]. Looking at the indexes assigned to these positions in the previous step, corresponding index values are retained for these positions in this step. In this case, the index of position 0 in the previous step is 1, index of position 3 in previous step is 2 and index of position 4 in the previous step is 0 as reflected below:

Elements$_2$: [0, 3, 4] Indexes$_2$: [1, 2, 0]

In doing so, the problem of finding the elements to be swapped, so that Elements$_2$, (i.e., [0, 3, 4]) can be changed to Elements$_1$ (i.e., [4, 0, 3]) is converted into a sorting problem, so that Indexes$_2$, (i.e., [1, 2, 0]) can be sorted in ascending order into Indexes$_1$ (i.e., [0, 1, 2]). The sorting is then done using a sorting algorithm to determine the necessary changes, for example using "quick-sort" although any other appropriate sorting technique may be used. Those same set of changes are then used to create a SWAP SERIES that represents the effect of all swap( ) and move( ) operations on the target array, so, in this case, the SWAP SERIES: "SWAP":[[1,2],[0,1]] is generated.

3) Generation of the INSERT SERIES for Inserted Elements:

Once the SWAP SERIES has been generated, the processor(s) use the Current Positions List to locate the position(s) of any inserted elements, in this example represented by "−1" values. The "Current State of Target List" is then used to get the current values for those inserted elements. In this example, the Current Positions List at the end of all changes is: [4, −1, 0, 3, −1] and the Current State of Target List is [7, 5, 4, 1, 3], so the element at index 1 was inserted at some point and its value is "5" and the element at index 4 was inserted and its value is "3" so, in this case, the INSERT SERIES: "INSERT":[[1,5],[4,3]] is generated.

4) Generation of the CHANGE SERIES for Changed Elements:

Finally, after the INSERT SERIES has been generated, the processor(s) use the Current Positions List, Current State of Target List and the copy of the original ordered set as follows to determine the changed elements.

The Current Positions List: [4, −1, 0, 3, −1] indicates, in terms of original positions and current positions of pre-existing elements (i.e., −1 values are ignored):

A) the 4th position in the original ordered set is now in the 0th position in the current target list;
B) the 0th position in the original ordered set is now in the 2nd position in current target list, and
C) the 3rd position in original ordered set is now in the 3rd position in the current target list (i.e., whatever happened during the course of the changes, at the end, in effect, it has not changed positions).

For each pre-existing position in the Current Positions List, the processor(s) compare the values in Current State of Target List and the copy of the original ordered set to determine whether there are any elements whose values changed.

Current State of Target List: [7, 5, 4, 1, 3] vs. copy of original ordered set: [6, 8, 5, 1, 7]

The comparison is done using the Current Positions List [4, −1, 0, 3, −1] to dictate the comparing of values between the two.

A) the 4th position in the original ordered set had a value of "7" and the 0th position in the Current State of Target List also has a value of "7", so no value change is required;
B) the 0th position in the original ordered set had a value of "6" and the 2nd position in Current State of Target List has a value of "4" so this value change is captured because the value at the 2nd index must be set to a value of "4";
C) the 3rd position in original ordered set had a value of "1" and the 3rd position in the Current State of Target List also has a value of "1", so no value change is required.

As a result, the CHANGE SERIES: "CHANGE":[[2,4]] is generated.

Thus, the concise representation for the nine (9) steps of changes would be: "REMOVE":[1,2], "SWAP":[[1,2],[0,1]], "INSERT":[[1,5],[4,3]], "CHANGE":[[2,4]] and involve only seven (7) steps to achieve the same end product as the (9) steps of changes.

At this point, it should be noted that this example is oversimplified in that the original ordered set has only a few elements, so it is a good illustration of the case where the changes would be sent from one location to another, so the concise representation would involve fewer steps and, consequently, less bandwidth to transfer the necessary changes to the location where the reconciliation needs to occur. In addition, the concise representation will require less processing (applying 7 changes) to implement than would be required by simply replicating the changes (applying 9 step).

The following is another example, illustrating of the power of this solution, involving changes to an ordered set containing the following values: [4, 23, 9, 12, 45, 18, 1, 89]

Presume that the following twenty-one (21) sequential changes are made to the ordered set:

swap(3, 6);
remove(3);
insert(2, 78);
swap(1, 5);
swap(0, 2);

insert(0, 34);
swap(6, 7);
remove(5);
set(0, 56);
swap(0, 7);
swap(4, 1);
insert(5, 5);
insert(7, 100);
set(4, 98);
swap(2, 6);
swap(0, 9);
set(3, 89);
insert(2, 45);
remove(0);
insert(10, 34);
remove(1);

The resulting state of the ordered set after all these changes is:

[9, 12, 89, 98, 5, 18, 100, 23, 89, 34]

Applying the instant solution using a positions list and following the rules set forth above, a "concise representation" for those twenty-one changes would simply be:

"REMOVE": [4,6],
"SWAP":[[0,2],[1,3],[3,4]],
"INSERT":[[3,98],[4,5],[6,100],[9,34]], and
"CHANGE":[[2,89]].

As a result, the twenty-one (21) steps have been reduced to only nine (9) steps. In other words, to obtain the end result of the above changes, the actual changes involved four (4) element removes, while the solution approach only requires (2) element REMOVEs, the actual changes involved eight (8) value swaps, while the solution approach only requires three (3) SWAPs, the actual changes involved six (6) element inserts, whereas the solution approach only has four (4) INSERTs, and the actual changes involved three (3) value changes, whereas the solution approach only requires one (1) CHANGE. Thus, the concise representation requires transfer of significantly less information to effect the same result, so the bandwidth/processing required to transfer those steps, relative to transferring the actual steps involved (and/or, for most large ordered sets, re-transferring a new copy of the changed ordered set), is advantageously reduced.

Having created a concise representation for use in reconciling the changed ordered set at another location, the concise representation is then transferred to the other location via, as described above, some communication path. Note here that, as described above, for instances where a single computer is maintaining multiple copies of the ordered list, for example, a system such as described in FIG. 2, the transfer may simply involve temporarily placing the concise representation somewhere so that it can be retrieved and used to reconcile a different ordered set.

Thereafter, the processor(s) will apply the concise representation to the ordered set at the second location.

Applying Concise Representation to Ordered Set "Copy" to be Reconciled

The application of the concise representation is performed by sequentially, applying the REMOVE SERIES to the ordered set copy to be reconciled (in decreasing position order), then, after the REMOVE SERIES has been applied, the SWAP SERIES is applied to the ordered set copy to be reconciled. Next, after the SWAP SERIES has been applied, the INSERT SERIES is applied to the ordered set copy to be reconciled (in increasing position order). Finally, after the INSERT SERIES has been applied, the CHANGE SERIES is applied to the ordered set copy to be reconciled.

Once the CHANGE SERIES has been applied to the ordered set copy to be reconciled, the two ordered sets of values will then be reconciled as of a time the reconciliation between the two ordered sets was required.

Returning to the example from above involving the original ordered set: [6, 8, 5, 1, 7] that was modified using nine (9) steps to result in a final ordered set of: [7, 5, 4, 1, 3], the instant solution approach yielded a seven (7) step concise representation of the changes:

"REMOVE":[1,2], "SWAP":[[1,2],[0,1]], "INSERT":[[1, 5],[4,3]], "CHANGE":[[2,4]]

Table 2 below shows the application of the concise representation to a copy of the original ordered set at another location as follows:

TABLE 2

| Instruction | Operation to copy of original ordered set (i.e., [6, 8, 5, 1, 7]) | Result |
| --- | --- | --- |
| "REMOVE":[1, 2] (Performed in decreasing position order) | Remove element at index 2<br>Remove element at index 1 | [6, 8, 1, 7]<br>[6, 1, 7] |
| "SWAP":[[1, 2], [0, 1]] | Swap elements at indexes 1 and 2 | [6, 7, 1] |
| "INSERT":[[1, 5], [4, 3]] (Performed in increasing position order) | Swap elements at indexes 0 and 1<br>Insert value 5 at index 1<br>Insert value 3 at index 4 | [7, 6, 1]<br>[7, 5, 6, 1]<br>[7, 5, 6, 1, 3] |
| "CHANGE":[[2, 4]] | Set value 4 at index 2 | [7, 5, 4, 1, 3] |

Thus, as can be seen, the concise representation yields the identical result using fewer operations, thus reducing the amount of processing needed to obtain the end result, thereby freeing up the processor(s) sooner for some other task(s).

Figure 3:
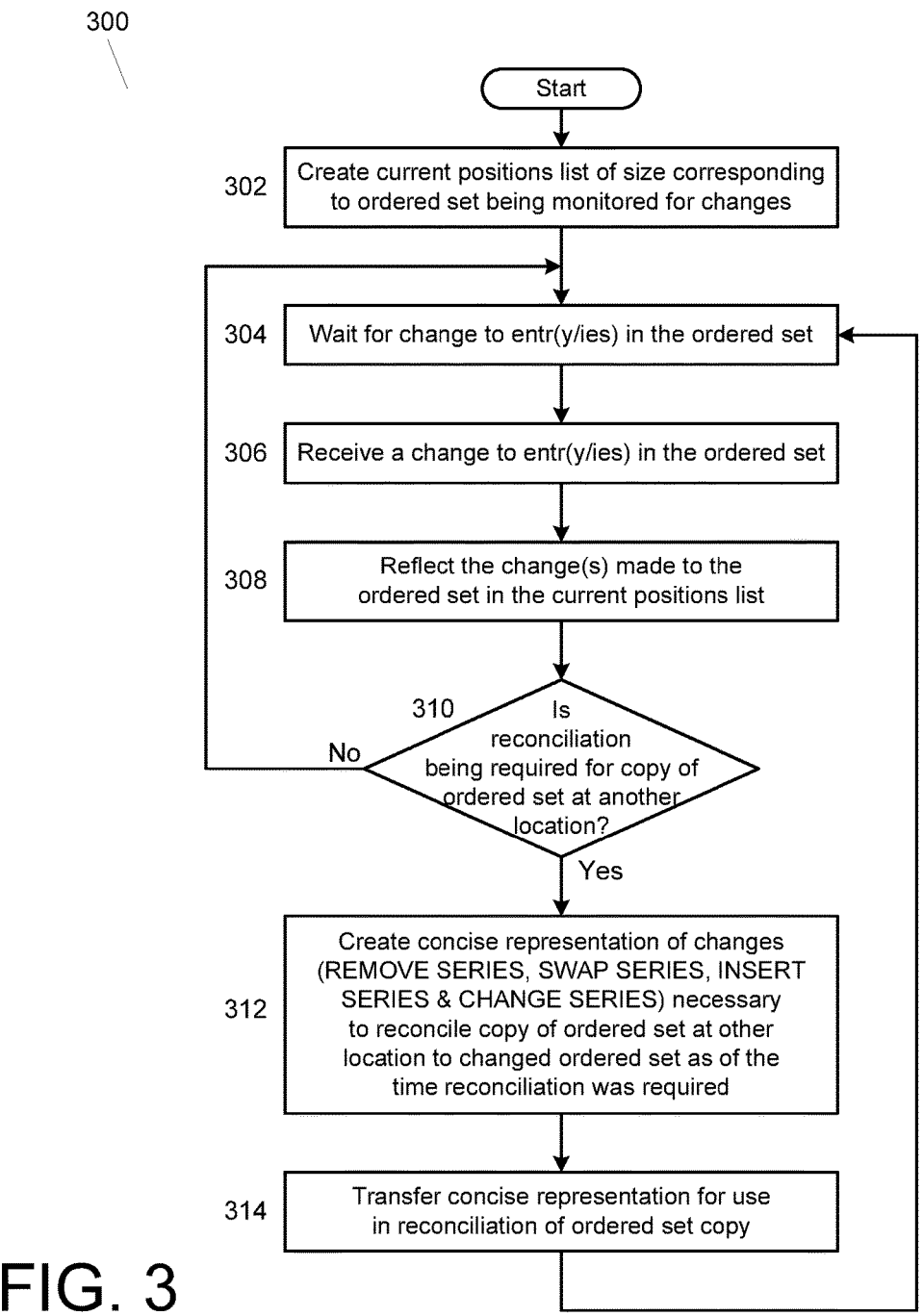
FIG. 3 is a flowchart for one simplified example of the portion of the solution process that would typically be performed in one location as a result of changes being made to an ordered list and a need to reconcile another copy of that ordered list with the changes.

FIG. 3 is a flowchart 300 for one simplified example of the portion of the solution process that would typically be performed in one location as a result of changes being made to an ordered list and a need to reconcile another copy of that ordered list with the changes.

The process begins with the creation by a processor of a "current positions list" that corresponds in size to an ordered set that will be changed (Step 302). Depending upon the implementation, the current positions list can be created upon an indication that a change is being made to the ordered set (e.g., as, or right before, a change is made, or when the ordered set is "checked out" or "locked") or it can be created at some point before any change is made.

The process then waits for change(s) to any entr(y/ies) in the ordered set (Step 304) and, upon receipt of any change(s) (Step 306), the processor will reflect the change(s) in the current Positions List (Step 308).

Once the changes are complete, the process 300 waits until a "reconciliation" is required (Step 310) (e.g., to make another copy of the ordered set coherent with the changed ordered set or, in a change management system, saving of the current state of the ordered set is required (i.e., it is being "checked in")). If no "reconciliation" is required, the process returns to Step 304 to wait for any more changes.

If, however, "reconciliation" is required in Step 310, then a concise representation of the changes is created as described herein, by creating (as needed) a REMOVE SERIES, a SWAP SERIES, an INSERT SERIES, and/or a CHANGE SERIES as described herein, for use in reconciliation of the changed ordered set and the copy of the ordered set (Step 312).

Then, the concise representation is "transferred" for use in the reconciliation (Step 314) by sending it to some place where it can be accessed and used to effect the necessary changes.

Table 3 below contains example pseudocode for creating a concise representation of a series of changes made to an ordered set according to the process in the flowchart 300 of FIG. 3.

In the pseudocode, the key-value pair having key name "REMOVE" is an operation (in the form of a JSON array) identifying indexes to be removed from the copy of the ordered set to be reconciled. When applying this removal, the elements should be removed in decreasing order of indexes so that removal of one element does not affect the pre-calculated index of the next element to be removed e.g. if "REMOVE":[1, 3, 4, 8], then element at position 8 should be removed first, then the element at position 4 should be removed, and so on.

The key-value pair having key name "SWAP" is an operation that is a JSON array which, in-turn, contains JSON arrays, each containing two elements to be swapped. When applying this swapping, it should be done in order from left to right e.g. if "SWAP":[[0,3],[2,3]], then values at indexes 0 and 3 should be swapped first and then values at indexes 2 and 3 should be swapped.

The key-value pair having key name "INSERT" is an operation that is also a JSON array which, in-turn, contains JSON arrays, each containing two elements: first element is the index at which the value specified by the second element is to be inserted. When applying this insert operation, the elements should be inserted in increasing order of indexes, e.g., if "INSERT":[[1,20],[4,3],[7,41]], then the value "20" should be inserted at index 1 first, then the value "3" should be inserted at index 4, and finally, the value "41" should be inserted at index 7, that is because the length of the initial ordered set may not be 7 when the insert operations start.

The key-value pair having key name "CHANGE" is an operation that is a JSON array which, in-turn, also contains JSON arrays, each containing two elements: the first element is the index to which the value, specified by the second element, is to be set (i.e., it replaces the existing value at that index). Unlike the REMOVE, SWAP and INSERT operations, the CHANGE operation is not sequence-sensitive, so the CHANGE operation components can be performed in any order.

TABLE 3

```
let 'targetArray' be the ordered set to which changes are made
let 'initialStateOfTargetArray' be the state of the target array (ordered set) before any changes are
  made to it, which is saved before the first change is made so that it can be used later
let 'targetArrayIndexChanges' be the ordered list used for tracking position changes to the targetArray
// Pseudocode for Removed and Inserted elements
let 'removedElements' be the JSON array that is value for the key "REMOVE"
let 'insertedElements' be the JSON array that is value for the key "INSERT"
// Use targetArrayIndexChanges to determine inserted and removed array elements
// - if a value between 0 and (initialStateOfTargetArray.length - 1) is not present in
// targetArrayIndexChanges, then the element at that index has been removed
// - if value at an index in targetArrayIndexChanges is -1, then the element at that
// index in targetArray is an inserted element
// First populate removedElements JSON array in ascending order of values 0, 1, 2 . . .
// Some of these elements will be removed in the following logic so that the removedElements
// JSON array will ultimately contain only the indexes to be removed
for i from 0 to (initialStateOfTargetArray.length - 1)
    insert i into removedElements
end for
// Iterate over targetArrayIndexChanges to determine removed and inserted elements
for i from 0 to (targetArrayIndexChanges.length - 1)
    let index = targetArrayIndexChanges[i]
    if index equals -1
      // targetArray[i] is an inserted element
      insert the JSON array [i, targetArray[i]] to insertedElements
    else
      // The index is still present in targetArray, i.e. it has not been removed.
      // Since removedElements was initialized to be an all-inclusive list, remove
      // the element from it at this point.
      remove element at index 'index' from removedElements
    end if
end for
// At this point, both removedElements and insertedElements may be already concise because they
// do not include canceling changes such as newly inserted elements that were eventually removed.
// This is because such elements will not be present at all in targetArrayIndexChanges.
// Now check whether removedElements and insertedElements can be made even more concise
// by accounting for another canceling change viz. a removed value was eventually inserted back in.
for i from 0 to (removedElements.length - 1)
    let removedIndex = removedElements[i]
    let removedValue = initialStateOfTargetArray[removedIndex]
    // Check insertedElements to see whether removedValue was inserted back in
    for j from 0 to (insertedElements.length - 1)
      // Each entry in insertedElements is a JSON array
      let insertedElement = JSON array at 'j'the position i.e. insertedElements[j]
      // insertedElement JSON array has two elements, index at which a value was inserted
      // and the inserted value
      let insertedIndex = insertedElement[0]
      let insertedValue = insertedElement[1]
      if removedValue equals inserted Value
        // A value at removedIndex was removed from the targetArray, but it was eventually
        // inserted back at index insertedIndex. In other words, we can interpret this as follows:
        // "The value that was at removedIndex initially is still present in the targetArray, but it
        // is now at index insertedIndex"
        let targetArrayIndexChanges[insertedIndex] = removedIndex
```

TABLE 3-continued

```
      // Remove corresponding entries in removedElements and insertedElements to make
      // them more concise. Note: The following two statements may need to be executed
      // outside of these for loops to avoid unexpected effects on for loop functioning
      remove 'j'th position from insertedElements
      remove 'i'th position from removedElements
      break out of the inner for loop
    end if
  end for
end for
// At this point, if removedElements and insertedElements still have entries in them, they are captured
// in the change representation using keys "REMOVE" and "INSERT" respectively
// Pseudocode for Moved or Swapped elements
let 'swappedElements' be the JSON array that is value for the key "SWAP" described above
// Non −1 values in targetArrayIndexChanges are the values that may have been moved from their original
// position and/or changed. The Following pseudo code focuses on capturing position changes (i.e., values
// for the key named "SWAP"). Changed values (i.e. value for the key named "CHANGE" above) are
// captured later.
// This pseudocode uses a sorting technique to determine how original positions of pre-existing elements
// may be swapped in order to reach current positions
// To begin with, two arrays are created as follows
// 1. originalOrderOfElements: contains numbers 0 through (initialStateOfTargetArray.length − 1) in
//        increasing order, except for the removed positions stored in removedElements array
// 2. currentOrderOfElements: contains values in targetArrayIndexChanges array, except for −1 values (be-
//        cause only working with pre-existing elements) in the same order as in targetArrayIndexChanges.
// Note: both these arrays are always of the same size
for i from 0 to (initialStateOfTargetArray.length − 1)
  if i is not in removedElements array
    insert i into originalOrderOfElements array
  end if
end for
for i from 0 to (targetArrayIndexChanges.length − 1)
  if targetArrayIndexChanges[i] not equal to −1
    insert targetArrayIndexChanges[i] into currentOrderOfElements array
  end if
end for
// Use the sorting technique to determine position-swaps needed for originalOrderOfElements to look
// like currentOrderOfElements.
for i from 0 to (number of elements in originalOrderOfElements or currentOrderOfElements arrays − 1)
  let arrayToBeSorted[i] = index of originalOrderOfElements[i] in currentOrderOfElements
end for
Sort the arrayToBeSorted in increasing order, note down swaps necessary to do this, add the swap operations
to swappedElements array.
Put swappedElements array in the change representation using key-value pair with key-name "SWAP"
// Pseudocode for Changed elements
let 'changedElements' be the JSON array that is value for the key "CHANGE" described above
// Check whether value of a pre-existing element has changed
for i from 0 to (targetArrayIndexChanges.length − 1)
  if targetArrayIndexChanges[i] is not equal to −1
    // i is the current position of an element in targetArray
    let currentValue = targetArray[i]
    // targetArrayIndexChanges[i] is the initial index of the element in initialStateOfTargetArray
    let initialValue = initialStateOfTargetArray[targetArrayIndexChanges[i]]
    if current Value not equal to initialValue
      insert JSON array [i, targetArray[i]] to changedElements array
    end if
  end if
end for
Put changedElements array in the change representation using key-value pair with key-name "CHANGE"
```

Figure 4:
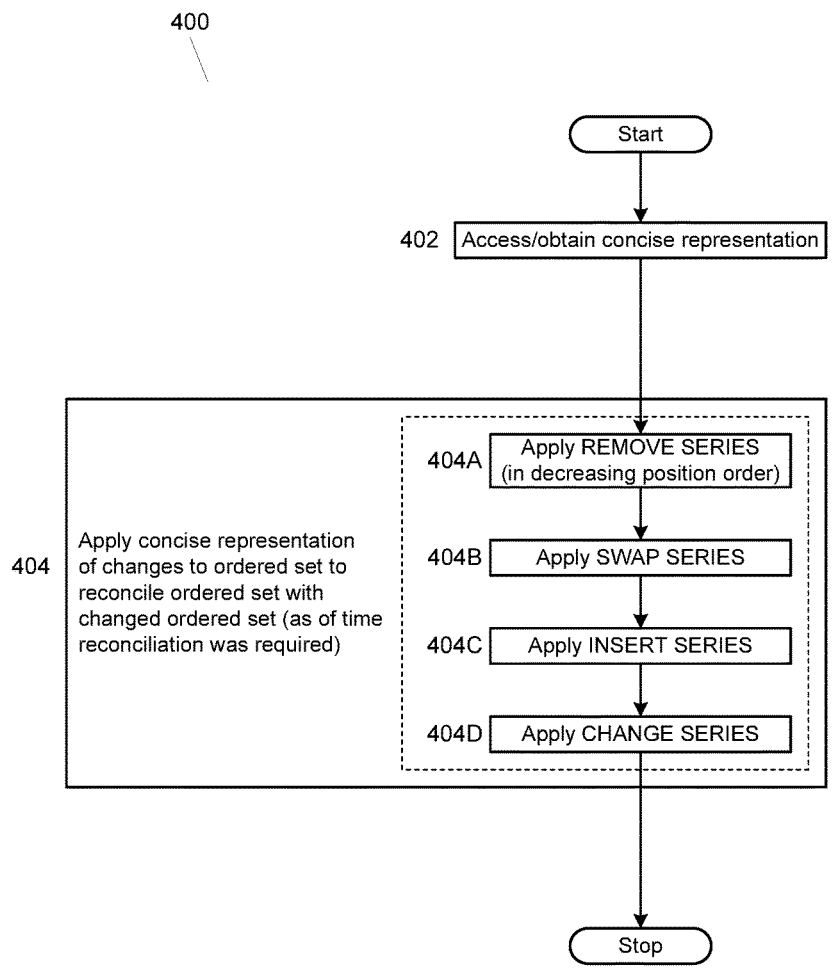
FIG. 4 is a flowchart of the portion of a simplified version of the solution process that makes use of the concise representation to synchronize a copy of an ordered set and a changed version of that ordered set.

FIG. 4 is a flowchart 400 of the portion of a simplified version of the solution process that makes use of the concise representation to synchronize a copy of an ordered set and a changed version of that ordered set (i.e., to reconcile the two).

As shown in FIG. 4, this portion of the process begins by accessing/obtaining the concise representation (Step 402). Then, the concise representation of the changes is applied to the copy of the ordered set that needs to be synchronized with the changed version of the ordered set (Step 404) which, depending upon the particular "SERIES" present in the concise representation will include one or more of the sub steps of, in sequence, applying (if present) the REMOVE SERIES (in decreasing position order) (Step 404A), then applying (if present) the SWAP SERIES (Step 404B) sequentially in order from left to right, then applying (if present) the INSERT SERIES (Step 404C) in increasing order of indexes and then, applying (if present) the CHANGE SERIES (Step 404D).

Table 4 below contains example pseudocode for applying the concise representation created by the pseudocode of Table 3 to a copy of original targetArray that is to be reconciled with the changed targetArray (i.e., to synchronize the two) according to the process in the flowchart 400 of FIG. 4.

TABLE 4

```
let copyOfTargetArray be the copy of original targetArray
if JSON change representation contains key "REMOVE"
    // Value for the "REMOVE" key is a JSON array containing indexes to be removed.
    // The indexes are stored in increasing order by the change representation pseudocode.
    // Remove values at indexes specified in the JSON array in decreasing order of indexes so that
    // removal of one element does not affect the pre-calculated index of next element to be removed
    let removedElements = JSON array value for the key "REMOVE"
    for i from (removedElements.length − 1) to 0
        remove the element at index removedElements[i] from copyOfTargetArray
    end for
end if
if JSON change representation contains key "SWAP"
    // Value for the "SWAP" key is a JSON array containing JSON arrays of elements to be
    swapped let swappedElementsArray = JSON array value for the key "SWAP"
    for i from 0 to (swappedElements.length − 1)
        let swappedElements = JSON array at swappedElementsArray[i]
        let index0 = swappedElements[0]
        let index1 = swappedElements[1]
        // swap values at index0 and index1
        let valueAtIndex0 = copyOfTargetArray[index0];
        let copyOfTargetArray[index0] = copyOfTargetArray[index1]
        let copyOfTargetArray[index1] = valueAtIndex0
    end for
end if
if JSON change representation contains key "INSERT"
    // Value for the "INSERT" key is a JSON array containing JSON arrays containing
    two elements:
    // first element is the index at which the value, specified at the second index, is to be inserted.
    // The elements are inserted in increasing order of indexes.
    let insertedElements = JSON array value for the key "INSERT"
    for i from 0 to (insertedElements.length − 1)
        let insertedElement = JSON array at insertedElements[i]
        insert the value insertedElement[1] at index insertedElement[0] in copyOfTargetArray
    end for
end if
if JSON change representation contains key "CHANGE"
    // Value for the "CHANGE" key is a JSON array containing JSON arrays containing
    two elements:
    // first element is the index at which the value specified at the second index is to be set
    // (i.e., it replaces the existing value at that index with the specified value)
    let changedElements = JSON array value for the key "CHANGE"
    for i from 0 to (changedElements.length − 1)
        let changedElement = JSON array at changedElements[i]
        let copyOfTargetArray[changedElement[0]] = changedElement[1]
    end for
end if
```

Based upon the foregoing, for completeness and understanding, Tables 5 through 8 below are program code components for one example implementation of the foregoing solution. The program code for this example implementation is written in the Java programming language and, for example, might be used in a client-server implementation. Note however that other implementations can be created that may be more efficient than the example implementation of Tables 5 through 8. Likewise, to illustrate that different approaches can be used, the example implementation of Tables 5 through 8 does not include programming to detect a circumstance where a removed value was eventually inserted back in, whereas the above pseudo code is more efficient because it does.

Specifically, Table 5 below contains program code implementing a constructor of "ListChangeTracker" class which takes the target list (ordered set) to be changed as an argument. It includes the methods "set", "remove", "insert", "swap" and "move"; which can be used to make different types of changes to the target list as well as the positions list. This class also has the logic for creating a JSON concise representation of the changes.

As should be evident, in use, "ListChangeTracker" would be executed by a processor where an ordered set is modified so that at least one other copy of the ordered set can be brought into synchronization with the ordered set that was changed.

TABLE 5

```
1   package array.changes;
2   import java.util.ArrayList;
3   import org.apache.commons.json.JSONArray;
4   import org.apache.commons.json.JSONException;
5   import org.apache.commons.json.JSONObject;
6   public class ListChangeTracker
7   {
8       private ArrayList<Integer> array = new ArrayList<Integer>( );
9       private int initialLength;
10      private ArrayList<Integer> initialValues = new ArrayList<Integer>( );
11      private final int INSERTED_ELEMENT_INDICATOR = −1;
```

TABLE 5-continued

```
12    private ArrayList<Integer> currentPositions = new ArrayList<Integer>( );
13    public ListChangeTracker( ArrayList<Integer> array )
14    {
15       this.array = array;
16       this.initialLength = this.array.size( );
17       for ( int i = 0; i < this.array.size( ); i++ )
18       {
19          this.initialValues.add( this.array.get( i ) );
20          this.currentPositions.add( i );
21       }
22    }
23    public void set( int index, int value )
24    {
25       this.array.set( index, value );
26    }
27    public void insert( int index, int value )
28    {
29       this.currentPositions.add( index, INSERTED_ELEMENT_INDICATOR );
30       this.array.add( index, value );
31    }
32    public void remove( int index )
33    {
34       this.currentPositions.remove( index );
35       this.array.remove( index);
36    }
37    public void move( int currentIndex, int newIndex )
38    {
39       Integer elemToBeMoved = this.currentPositions.remove( currentIndex );
40       this.currentPositions.add( newIndex, elemToBeMoved );
41       elemToBeMoved = this.array.remove( currentIndex );
42       this.array.add( newIndex, elemToBeMoved );
43    }
44    public void swap( int index1, int index2 )
45    {
46       Integer valueAtIndex2 = this.currentPositions.get( index2 );
47       this.currentPositions.set( index2, this.currentPositions.get( index1 ) );
48       this.currentPositions.set( index1, valueAtIndex2 );
49       valueAtIndex2 = this.array.get( index2 );
50       this.array.set( index2, this.array.get( index1 ) );
51       this.array.set( index1, valueAtIndex2 );
52    }
53    public JSONObject getChanges( ) throws JSONException
54    {
55       assert this.array.size( ) == this.currentPositions.size( );
56       System.out.println( "Original list: " + this.initialValues );
57       System.out.println( "Current state of the list: " + this.array );
58       System.out.println( "Current state of changed positions: " + this.currentPositions
59    );
60       JSONObject changeJSON = new JSONObject( );
61       /* ** Removed elements ** */
62       ArrayList<Integer> removedPositions = new ArrayList<Integer>( );
63       // First populate the removedPositions ArrayList in ascending order of values 0, 1, 2 . . .
64       for ( int i = 0; i <initialLength; i++ )
65       {
66          removedPositions.add( i );
67       }
68       // From the removedPositions ArrayList formed above, remove the
69       // positions that are still part of the currentPositions ArrayList
70       for ( int i = 0; i < currentPositions.size( ); i++ )
71       {
72          Integer position = currentPositions.get( i );
73          if ( position != INSERTED_ELEMENT_INDICATOR )
74          {
75             removedPositions.remove( (Object)position );
76          }
77       }
78       // During the process above, we created removedPositions ArrayList that is already sorted. This is
79       // desirable because when applying these changes, we remove the elements in decreasing order of
80       // positions. We do this so that removal of an element does not affect position calculation for the
81       // next element to be removed.
82       JSONArray removedElements = new JSONArray( );
83       for ( int i = 0; i < removedPositions.size( ); i++ )
84       {
85          removedElements.put( removedPositions.get( i ) );
86       }
87       if ( removedElements.size( ) > 0)
88       {
89          changeJSON.put( "REMOVE", removedElements );
90       }
91
```

TABLE 5-continued

```
92   /* ** Swapped elements ** */
93
94   // originalOrderOfRemainingElements will contain numbers 0 through (this.initialLength − 1) except
95   // removed positions stored in removedPositions ArrayList
96   ArrayList<Integer> originalOrderOfRemainingElements = new ArrayList<Integer>( );
97   for ( int i = 0; i < this.initialLength; i++ )
98   {
99     if ( !removedPositions.contains( i ) )
100    {
101       originalOrderOfRemainingElements.add( i ) ;
102    }
103  }
104  // currentOrderOfRemainingElements contains values in this.currentPositions array, except
105  // if the value is INSERTED_ELEMENT
106  ArrayList<Integer> currentOrderOfRemainingElements = new ArrayList<Integer>( );
107  for ( int i = 0; i < this.currentPositions.size( ); i++ )
108  {
109    if ( this.currentPositions.get( i ).intValue( ) != INSERTED_ELEMENT_INDICATOR )
110    {
111       currentOrderOfRemainingElements.add(this.currentPositions.get( i ) );
112    }
113  }
114  // Assert that arrays have the right size/length
115  int numRemainingElements = this.initialLength − removedPositions.size( );
116  assert originalOrderOfRemainingElements.size( ) == numRemainingElements;
117  assert currentOrderOfRemainingElements.size( ) == numRemainingElements;
118  // We use sorting algorithm to determine position-swaps needed for originalOrderOfRemainingElements
119  // to look like currentOrderOfRemainingElements
120  int[ ] arrayToBeSorted = new int[ numRemainingElements ];
121  for ( int i = 0; i < numRemainingElements; i++ )
122  {
123    arrayToBeSorted[i]=currentOrderOfRemainingElements.indexOf(originalOrderOfRemainingElements.get(i);
124  }
125  ArrayList<SwappedIndexes> swapArray = new Quicksort( ).sort( arrayToBeSorted );
126  JSONArray swappedElementsArray = new JSONArray( );
127  for ( int i = 0; i < swapArray.size( ); i++ )
128  {
129    // Some sorting algorithms may do some swaps wherein an element is swapped with itself.
130    // Make sure that such swaps are omitted.
131    if ( swapArray.get( i ).getIndex1( ) != swapArray.get( i ).getIndex2( ) )
132    {
133       JSONArray swappedElements = new JSONArray( );
134       swappedElements.put( swapArray.get( i ).getIndex1( ) );
135       swappedElements.put( swapArray.get( i ).getIndex2( ) );
136       swappedElementsArray.put( swappedElements );
137    }
138  }
139  if ( swappedElementsArray.size( ) > 0 )
140  {
141    changeJSON.put( "SWAP", swappedElementsArray );
142  }
143  /* ** Inserted elements ** */
144  JSONArray insertedElements = new JSONArray( );
145  for ( int i = 0; i < this.currentPositions.size( ); i++ )
146  {
147    if ( this.currentPositions.get( i ).intValue( ) == INSERTED_ELEMENT_INDICATOR )
148    {
149       JSONArray insertedElement = new JSONArray( );
150       insertedElement.add( i );
151       insertedElement.add( this.array.get( i ) );
152       insertedElements.add( insertedElement );
153    }
154  }
155  if ( insertedElements.size( ) > 0 )
156  {
157    changeJSON.put( "INSERT", insertedElements );
158  }
159  JSONArray changedElements = new JSONArray( );
160  for ( int i = 0; i < this.currentPositions.size( ); i++ )
161  {
162    if ( this.currentPositions.get( i ).intValue( ) != INSERTED_ELEMENT_INDICATOR )
163    {
164       // i is the current position of an element in this.array
165       // this.currentPositions.get( i ) is the initial position of that element
166       // Compare current value of the element with its initial value
167       if ( this.array.get( i ) != this.initialValues.get( this.currentPositions.get( i ) ) )
168       {
169          JSONArray changedElement = new JSONArray( );
170          changedElement.add( i );
171          changedElement.add( this.array.get( i ) );
```

TABLE 5-continued

```
172            changedElements.add( changedElement );
173          }
174       }
175    }
176    if ( changedElements.size( ) > 0)
177    {
178       changeJSON.put( "CHANGE", changedElements );
179    }
180    System.out.println( "Change representation: " + changeJSON );
181    System.out.println( "" );
182    return changeJSON;
183  }
184  public boolean compareWith( ArrayList<Integer> array)
185  {
186     return this.array.equals( array);
187  }
188 }
```

The helper classes "SwappedIndexes" and "Quicksort" are used by the "ListChangeTracker" class during creation of the concise representation.

Table 6 below contains program code implementing the helper class "Quicksort", which is simply a Java implementation of the classic quick-sort computer algorithm (Hoare, C. A. R., "Algorithm 64: Quicksort" Communications of the ACM. Vol. 4, No. 7, pp. 321 (1961)) along with some additional program code added to capture the position swaps using "SwappedIndexes" objects. Note that any alternative sorting algorithm can be used instead of the Quicksort algorithm, provided it is modified so that position-changes made by the algorithm are captured so that those can be added to the concise representation.

TABLE 6

```
1  package array.changes;
2  import java.util.ArrayList;
3  public class Quicksort
4  {
5     private int[ ] numbers;
6     private int number;
7     private ArrayList<SwappedIndexes> swapArray = new ArrayList<SwappedIndexes>( );
8     public ArrayList<SwappedIndexes> sort( int[ ] values )
9     {
10       this.numbers = values;
11       number = values.length;
12       quicksort(0, number - 1);
13       return this.swapArray;
14    }
15    private void quicksort(int low, int high)
16    {
17       int i = low, j = high;
18       // Get the pivot element from the middle of the list
19       int pivot = numbers[low + (high - low) / 2];
20       // Divide into two lists
21       while (i <= j)
22       {
23          // If the current value from the left list is smaller then the pivot
24          // element then get the next element from the left list
25          while (numbers[i] < pivot)
26          {
27             i++;
28          }
29          // If the current value from the right list is larger then the pivot
30          // element then get the next element from the right list
31          while (numbers[j] > pivot)
32          {
33             j--;
34          }
35          // If we have found a values in the left list which is larger then
36          // the pivot element and if we have found a value in the right list
37          // which is smaller then the pivot element then we exchange the
38          // values.
39          // As we are done we can increase i and j
40          if (i <= j)
41          {
42             exchange(i, j);
43             i++;
44             j--;
45          }
46       }
47       // Recursion
48       if (low < j)
```

TABLE 6-continued

```
49      quicksort(low, j);
50      if (i < high)
51        quicksort(i, high);
52    }
53    private void exchange(int i, int j)
54    {
55      int temp = numbers[i];
56      numbers[i] = numbers[j];
57      numbers[j] = temp;
58      this.swapArray.add(new SwappedIndexes(i, j));
59    }
60 }
```

Table 7 below contains program code implementing the helper class "SwappedIndexes" used by the "Quicksort" and "ListChangeTracker" classes.

TABLE 7

```
1   package array.changes;
2   public class SwappedIndexes
3   {
4     private int index1;
5     private int index2;
6     public SwappedIndexes(int index1, int index2)
7     {
8       this.index1 = index1;
9       this.index2 = index2;
10    }
11    public int getIndex1( )
12    {
13      return this.index1;
14    }
```

TABLE 7-continued

```
15    public int getIndex2( )
16    {
17      return this.index2;
18    }
19    public String toString( )
20    {
21      return "[" + this.index1 + ", " + this.index2 + "]";
22    }
23  }
```

Table 8 contains program code for the class "ListChanger" which is used to apply a concise representation to a copy of an ordered set in order to reconcile the copy to the changed ordered set and thereby synchronize the two. As should be evident, in use, "ListChanger" would be executed by a processor where the copy of the ordered set is located.

TABLE 8

```
1  package array.changes;
2  import java.util.ArrayList;
3  import org.apache.commons.json.JSONArray;
4  import org.apache.commons.json.JSONException;
5  import org.apache.commons.json.JSONObject;
6  public class ListChanger
7  {
8    public static void applyChanges(ArrayList<Integer> arrayList,
         JSONObject changes) throws JSONException
9    {
10     // Process removed elements
11     if (changes.containsKey("REMOVE"))
12     {
13       // getChanges( ) method in ListChangeTracker has already sorted
              elements in "REMOVED_ELEMENTS"
14       // in increasing order of positions to be removed. We remove the elements in decreasing order
15       // of positions, so that removal of an element does not affect position calculation for the next
16       // element to be removed.
17       JSONArray removedElements = changes.getJSONArray("REMOVE");
18       for (int i = removedElements.size( ) – 1; i >= 0; i--)
19       {
20         arrayList.remove(removedElements.getInt(i));
21       }
22     }
23     // Process swapped elements
24     if (changes.containsKey("SWAP"))
25     {
26       JSONArray swappedElementsArray = changes.getJSONArray("SWAP");
27       for ( int i = 0; i < swappedElementsArray.size( ); i++)
28       {
29         JSONArray swappedElements = swappedElementsArray.getJSONArray(i);
30         int index1 = swappedElements.getInt(0);
31         int index2 = swappedElements.getInt(1);
32         // Make the swap
33         int valueAtIndex1 = arrayList.get(index1);
34         arrayList.set(index1, arrayList.get(index2));
35         arrayList.set(index2, valueAtIndex1);
36       }
37     }
```

TABLE 8-continued

```
38      // Process inserted elements
39      if (changes.containsKey("INSERT"))
40      {
41         // getChanges( ) method in ListChangeTracker has already put elements in
           "INSERTED_ELEMENTS"
42         // in increasing order of positions to be inserted. We insert the elements in the increasing order
43         // of positions, so that adding of an element does not affect position calculation for the next
44         // element to be added.
45         JSONArray insertedElements = changes.getJSONArray("INSERT");
46         for (int i = 0; i < insertedElements.size( ); i++)
47         {
48            JSONArray insertedElement = insertedElements.getJSONArray(i);
49            int index = insertedElement.getInt(0);
50            int value = insertedElement.getInt(1);
51            // Insert the element
52            arrayList.add(index, value);
53         }
54      }
55      // Process changed elements
56      if (changes.containsKey("CHANGE"))
57      {
58         JSONArray changedElements = changes.getJSONArray("CHANGE" );
59         for (int i = 0; i < changedElements.size( ); i++)
60         {
61            JSONArray changedElement = changedElements.getJSONArray(i);
62            int index = changedElement.getInt(0);
63            int value = changedElement.getInt(1);
64            // Make the change
65            arrayList.set(index, value);
66         }
67      }
68   }
69 }
```

Based upon the foregoing, it should now be understood and appreciated that the solution approach described herein improves the operation of computers in general because it solves a problem that only arises in the computing arts (i.e., processor and inter-processor/inter-computer communication network/path bandwidth utilization, and/or storage space utilization) by uniquely reducing the bandwidth required to communicate the changes needed to ensure data coherency or storage required to store multiple versions of ordered list changes, and providing numerous advantages as a result, only some of which are presented herein.

Having described and illustrated the principles of this application by reference to one or more example embodiments, it should be apparent that the embodiment(s) may be modified in arrangement and detail without departing from the principles disclosed herein and that it is intended that the application be construed as including all such modifications and variations insofar as they come within the spirit and scope of the subject matter disclosed.

What is claimed is:

1. A computerized, bandwidth-reduced method of reconciling two ordered sets of values, one of the ordered sets being located at a first location and an other of the ordered sets being located at a second location, such that a series of changes made to the one of the ordered sets of values is reflected in the other of the ordered sets of values, the method comprising:

(a) using a processor of a computer at the first location,
 (i) maintaining, in storage, a positions list of a size corresponding to a number of entries in an ordered set of the at least two ordered sets, the list initially containing consecutive index numbers in ascending order reflective of an initial position of each entry in the list;
 (ii) tracking each positional change that is made to the ordered set and, as each positional change is made, replicating each positional change for the entries in the positions list such that
  (A) when an element of the ordered set is removed from the ordered set, the removal is replicated in the positions list,
  (B) when an element of the ordered set is moved to a new position, the position movement is replicated in the positions list,
  (C) when a new element is inserted into the ordered set at a specific position, a placeholder value is inserted into the positions list at a position corresponding to the specific position,
  (D) when a value of an element changes from a first value to a second value without a position change, no modification is reflected in the positions list, and
  (E) a concurrent movement of one element from a first position to a second position and value change at the second position is sequentially treated as a removal from a first position and new element insertion at the second position;
 (iii) once a reconciliation is required for the ordered set in the second location, then, at the first location using the processor, creating a concise representation of the changes using the positions list, then-current content of the ordered set, and content of the ordered set immediately prior to a first change in the series of changes by
  (A) identifying, in the positions list, all index numbers that do not appear in the positions list and generating a REMOVE SERIES which, when implemented in the second location, will remove all elements from the ordered set in the second location that correspond to the index numbers that do not appear in the positions list in the first location, (B) analyzing, positions of all pre-existing elements in the positions list both following the changes and prior to the changes, and generating a SWAP SERIES which, when implemented in the second location, will rearrange the elements from the ordered set in the second location to the locations corresponding to the ordered set in the first location, (C) identifying all placeholder values in the positions list and generating an INSERT SERIES which, when implemented in the second location, will insert the values from positions in the ordered set in the first location corresponding to those placeholder values into the ordered set in the second location, and (D) identifying, for all pre-existing index numbers in the positions list, whether their corresponding element values in the ordered set in the first location changed from their values prior to the changes, and for each instance where a value changed, generating a CHANGE SERIES which, when implemented in the second location, will effect corresponding value changes to the ordered set in the second location;

(b) transferring the concise representation from the first location at the second location via a communication path; and (c) using at least one processor, at the second location, applying the concise representation to the ordered set in the second location by
  (i) applying the REMOVE SERIES to the ordered set in the second location in decreasing position order,
  (ii) after the REMOVE SERIES has been applied, applying the SWAP SERIES to the ordered set in the second location,
  (iii) after the SWAP SERIES has been applied, applying the INSERT SERIES to the ordered set in the second location in increasing position order, and
  (iv) after the INSERT SERIES has been applied, applying the CHANGE SERIES to the ordered set in the second location;

whereby, after the application of the CHANGE SERIES at the second location, the two ordered sets of values in the first and second locations will be reconciled as of a time the reconciliation between the two ordered sets was required.

* * * * *